(12) United States Patent
Yang et al.

(10) Patent No.: US 12,231,062 B1
(45) Date of Patent: Feb. 18, 2025

(54) HIGH-VOLTAGE THREE-PHASE FOUR-BRIDGE-ARM TOPOLOGY STRUCTURE AND INVERTER

(71) Applicant: Jiangsu Koyoe Energy Technology Co., Ltd., Jiangsu (CN)

(72) Inventors: Yong Yang, Jiangsu (CN); Jianliang Mao, Jiangsu (CN); Lingfeng Mao, Jiangsu (CN); Junlong Ding, Jiangsu (CN); Pan Wang, Jiangsu (CN); Xiaohu Fan, Jiangsu (CN); Huiqing Wen, Jiangsu (CN); Weiguo Huang, Jiangsu (CN)

(73) Assignee: Jiangsu Koyoe Energy Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/766,196

(22) Filed: Jul. 8, 2024

(30) Foreign Application Priority Data

Aug. 17, 2023 (CN) .......................... 202311034745.5

(51) Int. Cl.
*H02M 7/5387* (2007.01)
*H02M 1/12* (2006.01)
*H02M 7/493* (2007.01)

(52) U.S. Cl.
CPC ............. *H02M 7/493* (2013.01); *H02M 1/12* (2013.01); *H02M 7/53871* (2013.01)

(58) Field of Classification Search
CPC ...... H02M 1/12; H02M 7/493; H02M 7/5387; H02M 7/53871
See application file for complete search history.

(56) References Cited

U.S. PATENT DOCUMENTS

2017/0250621 A1\* 8/2017 Townsend ............. H02M 1/084

FOREIGN PATENT DOCUMENTS

| CN | 107707143 A | | 2/2018 | |
|---|---|---|---|---|
| CN | 109873424 A | \* | 6/2019 | ............... H02J 3/01 |
| CN | 110676850 A | | 1/2020 | |

(Continued)

OTHER PUBLICATIONS

Rozanov et al., Analysis of the Current Balancing Device Based on Power Electronic Converter, IEEE, 2016, p. 882-888.

(Continued)

*Primary Examiner* — Gary L Laxton
(74) *Attorney, Agent, or Firm* — Bret E. Field; Bozicevic, Field & Francis LLP (57) ABSTRACT

Disclosed are a high-voltage three-phase four-bridge-arm topology structure and an inverter. The topology structure includes four bridge-arm circuits and a converter; one end of first bridge-arm circuit is connected to an A-phase high voltage line and the other end is connected to a first conversion module, one end of second bridge-arm circuit to a B-phase high voltage line and the other end to a second conversion module; one end of third bridge-arm circuit to a C-phase high voltage line and the other end to a third conversion module; one end of fourth bridge arm circuit to a ground line and the other end to a fourth conversion module, and the fourth bridge arm circuit is used to perform voltage compensation on the output voltages of the first bridge arm circuit, second bridge arm circuit, and third bridge arm circuit when the three phase high voltage lines are unbalanced.

10 Claims, 4 Drawing Sheets

(56) References Cited

FOREIGN PATENT DOCUMENTS

| CN | 111049156 A | * | 4/2020 | ............ H02J 3/1821 |
|----|----|----|----|----|
| CN | 114784779 A | | 7/2022 | |
| CN | 115001301 A | | 9/2022 | |
| CN | 116054186 A | | 5/2023 | |
| CN | 116582013 A | * | 8/2023 | ............ H02J 3/1821 |
| WO | WO2020211458 A1 | | 10/2020 | |

OTHER PUBLICATIONS

Wang, Research on Balance Method of Three-Phase Load In Low Voltage Distribution Network Based on the Voltage Source Converter, Jun. 2019, and its English abstract, 69 pages.

* cited by examiner

HIGH-VOLTAGE THREE-PHASE FOUR-BRIDGE-ARM TOPOLOGY STRUCTURE AND INVERTER

RELATED APPLICATION INFORMATION

This application claims priority to and the benefit of Chinese patent application Ser. No. 202311034745.5 filed on Aug. 17, 2023, incorporated herein by reference.

FIELD OF THE INVENTION

This disclosure relates to the field of designing circuit inverters, and in particular relates to a high-voltage three-phase four-bridge-arm topology structure and an inverter.

BACKGROUND OF THE INVENTION

Power quality problems caused by harmonics may occur during the operation of power systems, and these power quality problems can lead to huge economic losses. An inverter acts as an interface between the load and the renewable energy source, and it is important to ensure the stability and reliability of the inverter to eliminate harmonics.

Inverters include two-level inverters and multilevel inverters, and the current output from multilevel inverters contains less harmonics compared to two-level inverters. For this reason, most of the harmonics can be eliminated by simply connecting active power harmonizers in parallel as compensation harmonics on base of the multilevel inverters to alleviate the power quality problem of the electric power system.

However, the three-phase symmetrical structure of the three-phase inverter can only carry three-phase balanced loads, but in the process of application of the three-phase inverter, there will be three-phase unbalanced loads, and the circuit topology structure of the three-phase inverter is ineffective in carrying unbalanced loads, and there will still be a low-quality voltage and a high harmonic content in the voltage output from the three-phase inverter, which will reduce the quality of the power supply.

SUMMARY OF THE INVENTION

In order to alleviate the problem of low voltage quality and high harmonic content occurred in three-phase inverters due to unbalanced loads. In a first aspect, some embodiments of the present disclosure provide a high-voltage three-phase four-bridge-arm topology structure comprising: a first bridge arm circuit, a second bridge arm circuit, a third bridge arm circuit, a fourth bridge arm circuit, and a converter:
wherein said converter comprises a first conversion module, a second conversion module, a third conversion module and a fourth conversion module:
wherein one end of said first bridge arm circuit is connected to an A-phase high voltage line of three-phase high voltage lines, and the other end of said first bridge arm circuit is connected to said first conversion module: wherein one end of said second bridge arm circuit is connected to a B-phase high voltage line of said three-phase high voltage lines, and the other end of said second bridge arm circuit is connected to said second conversion module; wherein one end of said third bridge arm circuit is connected to a C-phase high voltage line of said three-phase high voltage lines, and the other end of said third bridge arm circuit is connected to said third conversion module: wherein one end of said fourth bridge arm circuit is connected to a ground line and the other end of said fourth bridge arm circuit is connected to said fourth conversion module:
said fourth bridge arm circuit is used to perform voltage compensation on an output voltage of said first bridge arm circuit, an output voltage of said second bridge arm circuit, and an output voltage of said third bridge arm circuit when said A-phase high voltage line, said B-phase high voltage line, and said C-phase high voltage line are in an unbalanced state.

In some feasible embodiments, said first conversion module comprises a first conversion module switching tube and a second conversion module switching tube, said first conversion module switching tube and said second conversion module switching tube being connected in series:
an emitter of said first conversion module switching tube is connected to a collector of said second conversion module switching tube at a first connection point.

In some feasible embodiments, said first bridge arm circuit comprises a first bridge arm switching tube, a second bridge arm switching tube, a third bridge arm switching tube and a fourth bridge arm switching tube:
said first bridge arm switching tube and said second bridge arm switching tube are connected in series on a first circuit, said third bridge arm switching tube and said fourth bridge arm switching tube are connected in series on a second circuit, and said first circuit is connected in parallel with said second circuit; and
said first connection point is connected in cascade with said second connection point, said second connection point being located between said third bridge arm switching tube and said fourth bridge arm switching tube.

In some feasible embodiments, an emitter of said first bridge arm switching tube and a collector of said second bridge arm switching tube are connected to a third connection point, said third connection point being connected to said A-phase high voltage line.

In some feasible embodiments, said first bridge arm circuit further comprises a third circuit, said third circuit being connected in parallel with said first circuit, said third circuit comprising a first capacitor and a second capacitor:
The collector of said first bridge arm switching tube and the collector of said third bridge arm switching tube are each connected to said first capacitor, and the emitter of said second bridge arm switching tube and the emitter of said fourth bridge arm switching tube are each connected to said second capacitor.

In some feasible embodiments, said first conversion module, said second conversion module, said third conversion module and said fourth conversion module are connected in parallel.

In some feasible embodiments, said converter further comprises a third capacitor, a fourth capacitor and a power supply module, said third capacitor and said fourth capacitor being connected in series to form a fourth circuit, said fourth circuit being connected to said power supply module.

In some feasible embodiments, a voltage of said power supply module is in a predetermined ratio to a voltage sum of said first bridge arm circuit, said voltage sum being a sum of a voltage of said first capacitor and a voltage of said second capacitor.

In some feasible embodiments, said first bridge arm circuit is configured to output a first voltage to said A-phase high voltage line based on said first bridge arm switching tube, said second bridge arm switching tube, said third bridge arm switching tube, said fourth bridge arm switching tube, said first conversion module switching tube and said second conversion module switching tube.

In a second aspect, some embodiments of the present disclosure provide an inverter, said inverter comprising a high-voltage three-phase four-bridge-arm topology structure as described in any one of the first aspect, said inverter being connected to three-phase high voltage lines as well as a ground line.

As can be seen from the above embodiments, the present disclosure provides a high-voltage three-phase four-bridge-arm topology structure and an inverter comprising four bridge-arm circuits of the same structure and a converter, wherein one end of the first bridge-arm circuit is connected to the A-phase high voltage line and the other end is connected to the first conversion module: one end of the second bridge-arm circuit is connected to the B-phase high voltage line and the other end is connected to the second conversion module; one end of the third bridge-arm circuit is connected to the C-phase high voltage line and the other end is connected to the third conversion module: one end of the fourth bridge arm circuit is connected to the ground line and the other end is connected to the fourth conversion module, and the fourth bridge arm circuit is used to perform voltage compensation on the output voltage of the first bridge arm circuit, the output voltage of the second bridge arm circuit, and the output voltage of the third bridge arm circuit when the A-phase high voltage line, the B-phase high voltage line, and the C-phase high voltage line are in an unbalanced state, so as to generate a high voltage by a multilevel and reduce harmonics in the voltage to improve the power supply quality of the electric power system.

BRIEF DESCRIPTION OF THE DRAWINGS

In order to illustrate the technical solutions of the present disclosure more clearly, the accompanying drawings to be used in the embodiments will be briefly described below, and it will be obvious to a person of ordinary skill in the art that other accompanying drawings can be obtained on the basis of these drawings without creative labor.

DETAILED DESCRIPTION OF THE EMBODIMENTS

In order to make the purpose and embodiments of the present disclosure clearer, the exemplary embodiments of the present disclosure will be described clearly and completely in the following in conjunction with the accompanying drawings in the exemplary embodiments of the present disclosure, and it is clear that the exemplary embodiments described are only a portion of the embodiments of the present disclosure, and not all of the embodiments.

It should be noted that the brief descriptions of terms in this disclosure are only for the purpose of facilitating the understanding of the embodiments described next, and are not intended to limit the embodiments of this disclosure. Unless otherwise indicated, these terms should be understood in their ordinary and usual meaning.

The terms "comprising" and "having," and any variations thereof, are intended to cover, but not exclusively include; e.g., a product or apparatus comprising a series of components need not be limited to all components clearly listed, but may include other components that are not clearly listed or that are inherent to the product or apparatus.

An electric power system is a system for the production and consumption of electrical energy consisting of power plants, transmission and transformation lines, power supply and distribution utilities, and power utilization. An electric power system may convert primary energy from nature into electrical energy through power generating units, and then supply the electrical energy to the consumer's electrical equipment through transmission, transformation and distribution.

Power quality problems caused by harmonics may occur during the operation of the electric power system, and these power quality problems can lead to huge economic losses. In order to supply power to the consumers, the electric power system also has information and control systems at various stages and levels to measure, regulate, control, protect, communicate and dispatch the production process of electrical energy to ensure that the electrical equipment receive safe electrical energy.

For this purpose, the harmonics generated by the electric power system during operation can be eliminated by setting up inverters. Inverters include two-level inverters and multilevel inverters, and the current output from a multilevel inverter contains less harmonics compared to a two-level inverter. For this reason, most of the harmonics can be eliminated by simply connecting active power harmonizers in parallel with the multilevel inverter as compensation harmonics to alleviate the power quality problem of the electric power system.

However, the three-phase symmetrical structure of the three-phase inverter can only carry three-phase balanced loads. But in the process of three-phase inverter application, three-phase unbalanced loads can occur, and the circuit topology structure of the three-phase inverter is ineffective in carrying unbalanced loads. As a result, the three-phase inverter will still have a low quality of the output voltage and a high harmonic content of the voltage, which will lead to the power quality problems.

Figure 1:
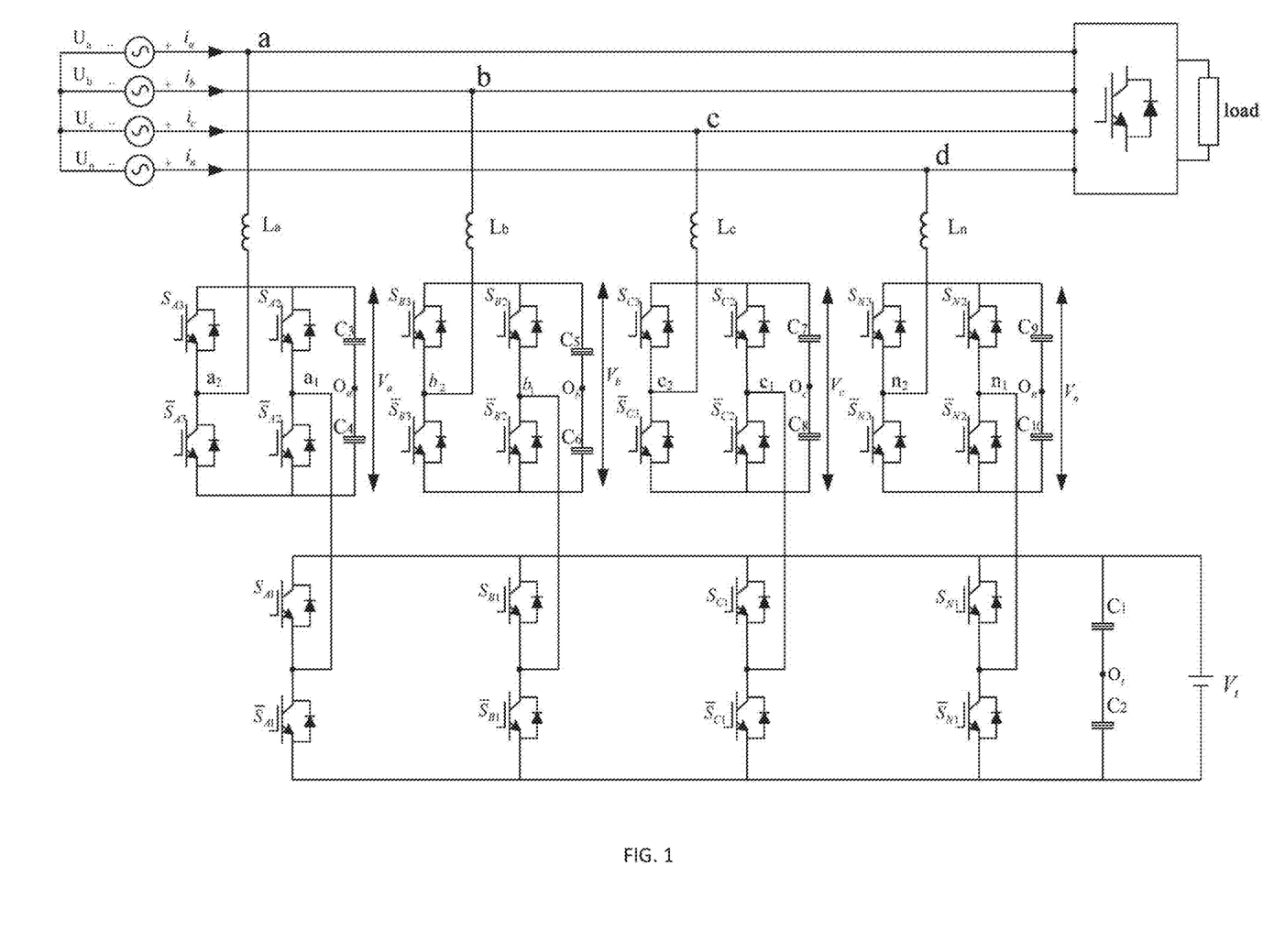
FIG. 1 shows a schematic diagram of connection of a high-voltage three-phase four-bridge-arm topology structure provided by an embodiment of the present disclosure.

In order to alleviate the power quality problems of the three-phase inverter caused by the unbalanced load, which result in low quality voltage and high harmonic content of the three-phase inverter and thus leads to the power problem of the electric power system, as shown in FIG. 1, a part of the embodiments of the present disclosure provide a high-voltage three-phase four-bridge-arm topology structure comprising a first bridge arm circuit, a second bridge arm circuit, a third bridge arm circuit, a fourth bridge arm circuit, and a converter, wherein said topology structure is connected to a three-phase high voltage line and a ground line to output a voltage for the three-phase high voltage lines.

Figure 2:
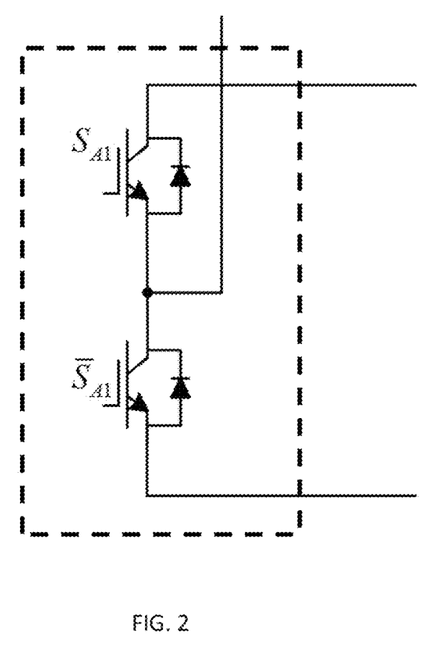
FIG. 2 shows a schematic diagram of a structure of a first conversion module of an embodiment of the present disclosure.

The converter comprises a first conversion module, a second conversion module, a third conversion module and a fourth conversion module, wherein the first conversion module, the second conversion module, the third conversion module and the fourth conversion module have the same structure, and wherein the first conversion module is taken as an example, as shown in FIG. 2, which conversion module comprises a first conversion module switching tube $S_{A1}$ and a second conversion module switching tube $S_{A1}$, two of which being connected in series with each other.

In some embodiments, the conversion module switching tube is a triode structure, said triode structure comprising a collector and an emitter, the emitter of the first conversion module switching tube $S_{A1}$ is connected to the collector of the second conversion module switching tube $S_{A1}$, and the emitter of the first conversion module switching tube $S_{A1}$ is connected to the collector of the second conversion module switching tube $S_{A1}$ at a first connection point.

The three-phase high voltage lines include an A-phase high voltage line, a B-phase high voltage line and a C-phase high voltage line, three of which should be in a balanced state, i.e., the output voltages are the same, when the electric power system is in operation.

In some embodiments, one end of the first bridge arm circuit is connected to the A-phase high voltage line, the other end of the first bridge arm circuit is connected to the first conversion module of the converter: one end of the second bridge arm circuit is connected to the B-phase high voltage line, the other end of the second bridge arm circuit is connected to the second conversion module of the converter: one end of the third bridge arm circuit is connected to the C-phase high voltage line, and the other end of the third bridge arm circuit is connected to the third conversion module: one end of the fourth bridge arm circuit is connected to a ground line, and the other end of the fourth bridge arm circuit is connected to the fourth conversion module of the converter.

In some embodiments, a tester may obtain output voltages of the A-phase high voltage line, the B-phase high voltage line, and the C-phase high voltage line by the voltage detection device, and output information about the unbalanced high voltage line when the output voltages of the three-phase high voltage lines are in an unbalanced state. The fourth bridge arm circuit may perform voltage compensation on the output voltage of the unbalanced high voltage line when the A-phase high voltage line, the B-phase high voltage line, and the C-phase high voltage line are in the unbalanced state, so that the three-phase high voltage lines, in the unbalanced state, output a balanced voltage to reduce power quality problems and improve the operational efficiency of the electric power system.

In some embodiments, the first bridge arm circuit, the second bridge arm circuit, and the third bridge arm circuit have the same structure and function, and the difference only lies in the different high voltage lines connected. For this reason, this embodiment is illustrated exemplarily only with the first bridge arm circuit, and the structures and functions of the second bridge arm circuit and the third bridge arm circuit will not be further described.

The first bridge arm circuit may include an H-bridge arm, wherein the H-bridge arm may include a first bridge arm switching tube $S_{A2}$, a second bridge arm switching tube $S_{A2}$, a third bridge arm switching tube $S_{A3}$, and a fourth bridge arm switching tube $\overline{S}_{A3}$, wherein the first bridge arm switching tube $S_{A2}$ and the second bridge arm switching tube $S_{A2}$ are connected in series on a first circuit, and the third bridge arm switching tube $S_{A3}$ and the fourth bridge arm switching tube $S_{A3}$ are connected in series on a second circuit, and wherein the first and the second circuits are connected in parallel.

As the electric power system operates in a way that the voltage needs to be transformed according to the requirements of the power consumption, the first bridge arm circuit needs to be connected to a converter in order to realize the function of transforming the voltage. For this purpose, a second connection point a1 may be provided on the first circuit or the second circuit to connect to the first connection point of the first conversion module. In the case of the second circuit, for example, the third bridge arm switching tube $S_{A3}$ and the fourth bridge arm switching tube 533 are connected to the second connection point a1, and the second connection point a1 may be connected to the first connection point in order to adjust the output voltage of the first bridge arm circuit via the first conversion module.

In some embodiments, the first bridge arm circuit and the A-phase high voltage line may also be connected via the connection point, and when the second circuit is connected to the first conversion module, the first circuit in the first bridge arm circuit may make a connection point formed by connecting an emitter of the first bridge arm switching tube $S_{A2}$ and a collector of the second bridge arm switching tube $S_{A2}$ as the third connection point a2, and the third connection point a2 may be connected to the A-phase high voltage line to realize the output voltage of the first bridge arm circuit to the A-phase high voltage line.

In some embodiments, the first bridge arm circuit further comprises a third circuit, which is connected in parallel with the first circuit, and the third circuit comprises a first capacitor C3 and a second capacitor C4, wherein a collector of the first bridge arm switching tube $S_{A2}$ and a collector of the third bridge arm switching tube $S_{A3}$ are connected to the first capacitor C3, respectively, and an emitter of the second bridge arm switching tube $S_{A2}$ and an emitter of the fourth bridge arm switching tube $S_{A3}$ are connected to the second capacitor C4, respectively.

The first capacitor C3 and the second capacitor C4 may have the same voltage rating to maintain the same voltage division state. The first capacitor C3 and the second capacitor C4 may provide power for the output voltage of the first bridge arm circuit, and in some embodiments, a power supply module having the same voltage sum as the first capacitor and the second capacitor may be used instead of the first capacitor C3 and the second capacitor C4.

Corresponding to the first conversion module, a second conversion module in the converter may convert the output voltage of the second bridge arm circuit, a third conversion module may convert the output voltage of the third bridge arm circuit, and a fourth conversion module may convert the output voltage of the fourth bridge arm circuit. In some embodiments, the first conversion module, the second conversion module, the third conversion module, and the fourth conversion module may be connected in parallel.

In some embodiments, the converter further includes a third capacitor C1, a fourth capacitor C2, and a power supply module, wherein the third capacitor C1 and the fourth capacitor C2 are connected in series to form a fourth circuit, and the fourth circuit is connected to the power supply module. In the fourth circuit, the third capacitor C1 and the fourth capacitor C2 may remove some of the harmonics generated by the converter when converting voltages, thereby reducing power quality problems generated by the harmonics.

In some embodiments, the voltage of the power supply module may be proportional to the voltage of the first bridge arm circuit in a predetermined manner, said voltage sum being the sum of the voltage of the first capacitor C1 and the voltage of the second capacitor C2. For example, when the voltage of the power module is $V_t$, the voltages of the first capacitor C1 and the second capacitor C2 are $V_t/2$, respectively.

In some embodiments, the first bridge arm circuit may also output a first voltage to said A-phase high voltage line according to the first bridge arm switching tube $S_{A2}$, the second bridge arm switching tube $S_{A2}$, the third bridge arm switching tube $S_{A3}$, and the fourth bridge arm switching tube $S_{A3}$, the first conversion module switching tube $S_{A1}$, and the second conversion module switching tube $S_{A1}$. The voltage outputs are different for different switching modes of the switching tubes, and again taking the first bridge arm circuit as an example, a output voltage table is as follows:

TABLE 1

Table of output modes of single-phase high voltage line

| Mode | $S_{m3}$ | $S_{m2}$ | $S_{m1}$ | Output voltage $V0\left(V_a = V_b = V_c = V_n = \dfrac{V_t}{2}\right)$ | |
|---|---|---|---|---|---|
| 0 | 0 | 0 | 0 | $-\dfrac{V_t}{2}$ | $-V_k$ |
| 1 | 0 | 0 | 1 | $\dfrac{V_t}{2}$ | $V_k$ |
| 2 | 0 | 1 | 0 | $-V_k - \dfrac{V_t}{2}$ | $-2V_k$ |
| 3 | 0 | 1 | 1 | $-V_k + \dfrac{V_t}{2}$ | 0 |
| 4 | 1 | 0 | 0 | $V_k - \dfrac{V_t}{2}$ | 0 |
| 5 | 1 | 0 | 1 | $V_k + \dfrac{V_t}{2}$ | $2V_k$ |
| 6 | 1 | 1 | 0 | $-\dfrac{V_t}{2}$ | $-V_k$ |
| 7 | 1 | 1 | 1 | $\dfrac{V_t}{2}$ | $V_k$ |

Figure 3:
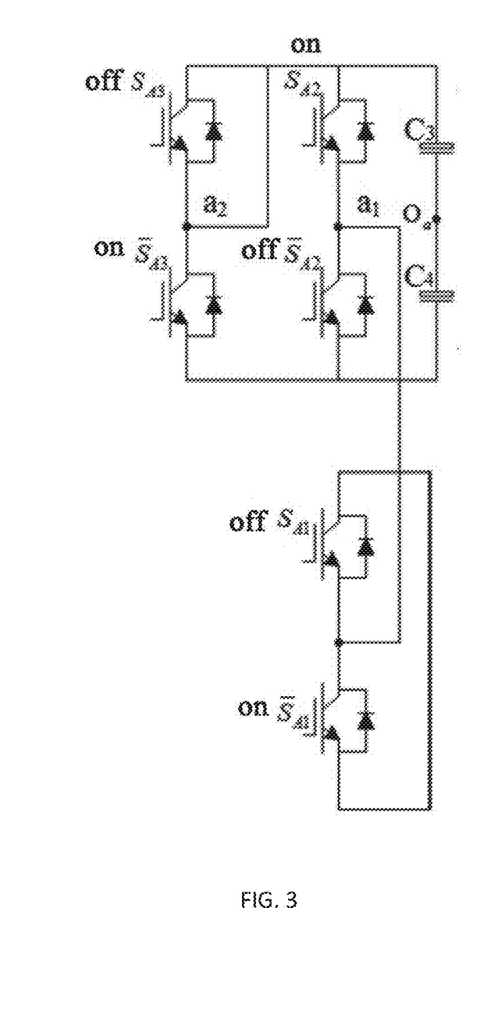
FIG. 3 shows a schematic diagram of a switching tube conduction according to the output voltage of the first bridge arm circuit of an embodiment of the present disclosure.

In Table 1, for the states of the switching tubes $Sm_3$, $Sm_2$, $Sm_1$ (m=A, B, C, N), "1" represents that the switching tubes $S_x$ are on and the corresponding $\overline{S}_x$ off, and "0" represents that the switching tubes $\overline{S}_x$ are off and the corresponding $S_x$ on, where x may be A1, A2, A3, B1, B2, B3, C1, C2, C3, N1, N2, and N3. For example, taking the first bridge arm circuit as an example, as shown in FIG. 3, when the first bridge arm circuit is in mode 1, $S_{A1}$ is off, $\overline{S}_{A1}$ is on, $S_{A2}$ is on, $\overline{S}_{A2}$ is off, $S_{A3}$ is off, $\overline{S}_{A3}$ is on, and the output voltage $V_0$ of mode 1 is $V_k$.

For the first bridge arm circuit, there are seven voltage output modes, and similarly, the second bridge arm circuit, the third bridge arm circuit, and the fourth bridge arm circuit have the same seven voltage output modes too, and for this reason, the different bridge arm circuits can realize multi-level voltage outputs through the permutation and combination of the voltage output modes, so as to effectively reduce the harmonic content of the output voltages and currents according to the multilevel voltage outputs, and improve the output voltage and current quality.

Figure 4:
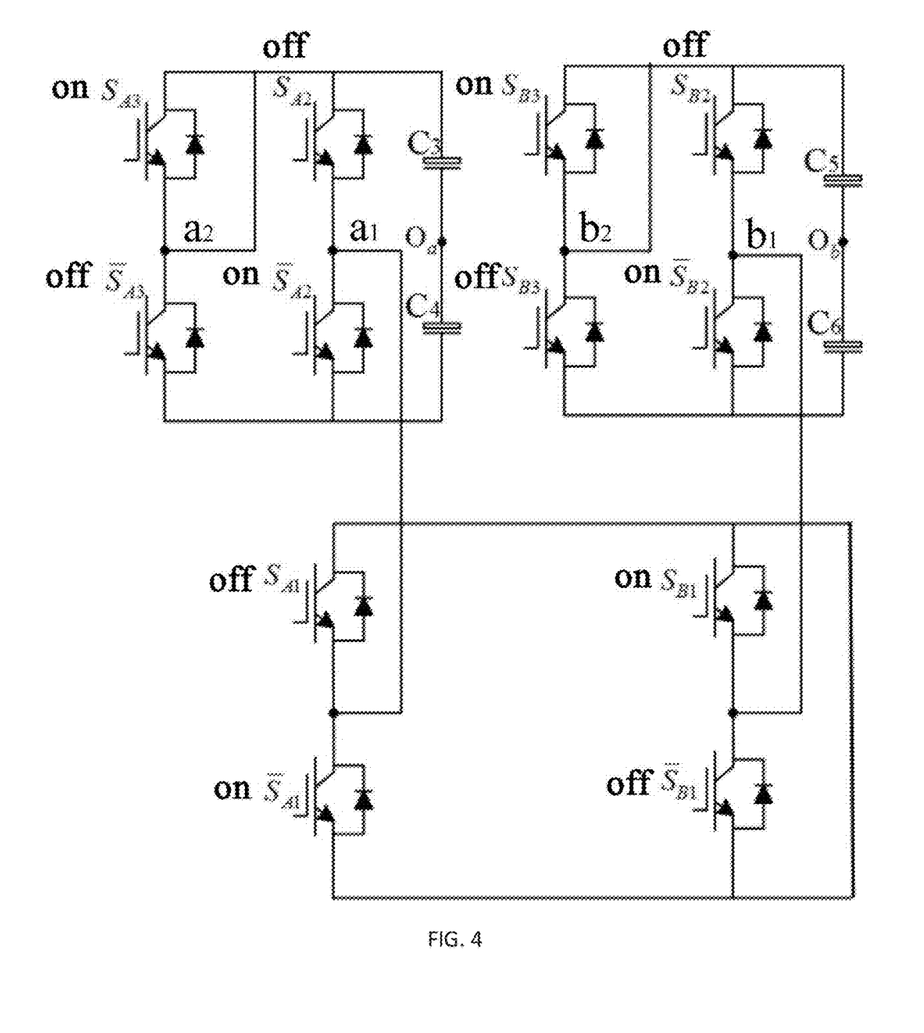
FIG. 4 shows a schematic diagram of switching tube conduction according to the output voltage of a plurality of bridge arm circuits of an embodiment of the present disclosure.

For example, as shown in FIG. 4, when the first bridge arm circuit outputs a voltage in mode 3 and the second bridge arm circuit outputs a voltage in mode 5, the switching tubes of the first bridge arm circuit are in the following condition: $S_{A1}$ off, $\overline{S}_{A1}$ on, $S_{A2}$ on, $\overline{S}_{A2}$ off, $S_{A3}$ on, $\overline{S}_{A3}$ off, and the switching tubes of the second bridge arm circuit are in the following condition: $S_{B1}$ on, $\overline{S}_{B1}$ off, $S_{B2}$ off, $\overline{S}_{B2}$ on, $S_{B3}$ on, $\overline{S}_{B3}$ off, where the first bridge arm circuit outputs a voltage of 0, and the second bridge arm circuit outputs an output voltage of the second bridge arm circuit is $2V_k$.

In some embodiments, since the fourth bridge arm circuit can perform voltage compensation on the output voltages of the first bridge arm circuit, the second bridge arm circuit, and the third bridge arm circuit when the three-phase high voltage line is connected to an unbalanced load, a tester can determine, based on the output modes of the voltages of the first bridge arm circuit, the second bridge arm circuit, and the third bridge arm circuit, which voltage line is in an unbalanced state, and calculate, based on the output modes, the output voltage of the voltage line in the unbalanced state. And then he may compare the output voltage of the voltage line in the unbalanced state with the output voltage of the voltage line in the normal state, and calculate a voltage difference. After calculating the voltage difference, a voltage output mode of the fourth bridge arm circuit may be set according to the voltage difference, thereby performing voltage compensation according to the unbalanced voltage line.

In some embodiments, after completing the construction of the topology structure, a test may also be executed on the topology structure to detect a voltage compensation error of the topology structure. In this embodiment, the topology structure described above may be connected to a test high voltage line, wherein the test high voltage line may be connected with an out-of-balance load, thereby providing a test environment.

The tester may modify the voltage output modes of the first bridge arm circuit, the second bridge arm circuit, the third bridge arm circuit, and the fourth bridge arm circuit and the parameters of the components in the circuits according to the test environment, thereby providing a large number of different test environments and improving the accuracy of the error calculation. If the error of the voltage compensation is less than an error threshold, it means that the topology structure can be connected to the electric power system to perform the work, and if the error of the voltage compensation is greater than the error threshold, it means that the topology structure does not satisfy the work requirements, and it is necessary to re-execute test modifications to the components or output modes of the topology structure.

Some embodiments of the present disclosure also provide an inverter, said inverter comprising the above-mentioned high-voltage three-phase four-bridge-arm topology structure, the inverter being connected to three-phase high voltage lines as well as a ground line.

As can be seen from the above embodiments, the present disclosure provides a high-voltage three-phase four-bridge-arm topology structure and an inverter, wherein the high-voltage three-phase four-bridge-arm topology structure comprises four bridge-arm circuits of the same structure and a converter, wherein one end of the first bridge-arm circuit is connected to the A-phase high voltage line and the other end is connected to the first conversion module, wherein one end of the second bridge-arm circuit is connected to the B-phase high voltage line and the other end is connected to the second conversion module, wherein one end of the third bridge-arm circuit is connected to the C-phase high voltage line and the other end is connected to the third conversion module, wherein one end of the fourth bridge arm circuit is connected to a ground line and the other end is connected to the fourth conversion module, and the fourth bridge arm circuit is used to perform voltage compensation on the output voltage of the first bridge arm circuit, the output voltage of the second bridge arm circuit, and the output voltage of the third bridge arm circuit when the A-phase high voltage line, the B-phase high voltage line, and the C-phase high voltage line are in an unbalanced state, to generate a high voltage by a multilevel, also reduce harmonics in the voltage and improve the power supply quality of the electric power system.

Finally, it should be noted that the above embodiments are only used to illustrate the technical solutions of the present disclosure, not to limit them: although the present disclosure has been described in detail with reference to the foregoing embodiments, a person of ordinary skill in the art should understand that it is still possible to modify the technical solutions stated in the foregoing embodiments, or to make equivalent substitutions for some or all of the technical features therein; and such modifications or substitutions do not take the essence of the corresponding technical solutions out of the scope of the technical solutions of the embodiments of the present disclosure.

For the convenience of explanation, the above description has been made in connection with specific embodiments. However, the above exemplary discussion is not intended to be exhaustive or to limit the embodiments to the specific forms disclosed above. A variety of modifications and deformations can be obtained in accordance with the above teachings. The above embodiments have been selected and described for the purpose of better explaining the present disclosure, thereby enabling those skilled in the art to better use the described embodiments.

What is claimed is:

1. A high-voltage three-phase four-bridge-arm topology structure, comprising: a first bridge arm circuit, a second bridge arm circuit, a third bridge arm circuit, a fourth bridge arm circuit and a converter:
    wherein the converter comprises a first conversion module, a second conversion module, a third conversion module and a fourth conversion module:
    wherein one end of the first bridge arm circuit is connected to an A-phase high voltage line of three-phase high voltage lines, and the other end of the first bridge arm circuit is connected to the first conversion module: wherein one end of the second bridge arm circuit is connected to a B-phase high voltage line of the three-phase high voltage lines, and the other end of the second bridge arm circuit is connected to the second conversion module; wherein one end of the third bridge arm circuit is connected to a C-phase high voltage line of the three-phase high voltage line, the other end of the third bridge arm circuit is connected to the third conversion module: one end of the fourth bridge arm circuit is connected to a ground line and the other end of the fourth bridge arm circuit is connected to the fourth conversion module;
    the fourth bridge arm circuit is used to perform voltage compensation on an output voltage of the first bridge arm circuit, an output voltage of the second bridge arm circuit and an output voltage of the third bridge arm circuit when the A-phase high voltage line, the B-phase high voltage line and the C-phase high voltage line are in an unbalanced state.

2. The high-voltage three-phase four-bridge-arm topology structure according to claim 1, wherein the first conversion module comprises a first conversion module switching tube and a second conversion module switching tube, the first conversion module switching tube and the second conversion module switching tube being connected in series: an emitter of the first conversion module switching tube is connected to a collector of the second conversion module switching tube at a first connection point.

3. The high-voltage three-phase four-bridge-arm topology structure according to claim 2, wherein the first bridge arm circuit comprises a first bridge arm switching tube, a second bridge arm switching tube, a third bridge arm switching tube and a fourth bridge arm switching tube:
    the first bridge arm switching tube and a second bridge arm switching tube are connected in series on a first circuit, and the third bridge arm switching tube and the fourth bridge arm switching tube are connected in series on a second circuit, the first circuit being connected in parallel with the second circuit:
    the first connection point is connected in cascade with a second connection point, and the second connection point is located between the third bridge arm switch tube and the fourth bridge arm switch tube.

4. The high-voltage three-phase four-bridge-arm topology structure according to claim 3, wherein an emitter of the first bridge arm switching tube and a collector of the second bridge arm switching tube are connected to a third connection point, the third connection point being connected to the A-phase high voltage line.

5. The high-voltage three-phase four-bridge-arm topology structure according to claim 4, wherein the first bridge arm circuit further comprises a third circuit, the third circuit being connected in parallel with the first circuit, and the third circuit comprising a first capacitor and a second capacitor on the third circuit:
    a collector of the first bridge arm switching tube and a collector of the third bridge arm switching tube are each connected to the first capacitor, and an emitter of the second bridge arm switching tube and an emitter of the fourth bridge arm switching tube are each connected to the second capacitor.

6. The high-voltage three-phase four-bridge-arm topology structure according to claim 5, wherein the first conversion module, the second conversion module, the third conversion module and the fourth conversion module are connected in parallel.

7. The high-voltage three-phase four-bridge-arm topology structure according to claim 6, wherein the converter further comprises a third capacitor, a fourth capacitor and a power supply module, the third capacitor and the fourth capacitor being connected in series to form a fourth circuit, and the fourth circuit being connected to the power supply module.

8. The high-voltage three-phase four-bridge-arm topology structure according to claim 7, wherein a voltage of the power supply module is in a predetermined ratio to a voltage sum of the first bridge arm circuit, the voltage sum being a sum of a voltage of the first capacitor and a voltage of the second capacitor.

9. The high-voltage three-phase four-bridge-arm topology structure according to claim 3, wherein the first bridge arm circuit is configured to output a first voltage to the A-phase high voltage line based on the first bridge arm switching tube, the second bridge arm switching tube, the third bridge arm switching tube, the fourth bridge arm switching tube, the first conversion module switching tube, and the second conversion module switching tube.

10. An inverter, wherein the inverter comprises the high-voltage three-phase four-bridge-arm topology structure as claimed in claim 1, the inverter being connected to three-phase high voltage lines as well as a ground line.

* * * * *